(12) United States Patent
Lauterbach

(10) Patent No.: US 7,877,559 B2
(45) Date of Patent: Jan. 25, 2011

(54) MECHANISM TO ACCELERATE REMOVAL OF STORE OPERATIONS FROM A QUEUE

(75) Inventor: Gary Lauterbach, Los Altos, CA (US)

(73) Assignee: Globalfoundries Inc., Grand Cayman (KY)

( * ) Notice: Subject to any disclaimer, the term of this patent is extended or adjusted under 35 U.S.C. 154(b) by 662 days.

(21) Appl. No.: 11/944,864

(22) Filed: Nov. 26, 2007

(65) Prior Publication Data
US 2009/0138659 A1 May 28, 2009

(51) Int. Cl.
G06F 12/00 (2006.01)
(52) U.S. Cl. .......................... 711/159; 710/56
(58) Field of Classification Search .................. None
See application file for complete search history.

(56) References Cited
U.S. PATENT DOCUMENTS

| | | | |
|---|---|---|---|
| 5,053,631 A | 10/1991 | Perlman et al. | |
| 5,226,126 A | 7/1993 | McFarland et al. | |
| 5,355,457 A | 10/1994 | Shebanow et al. | |
| 5,546,554 A | 8/1996 | Yung et al. | |
| 5,651,125 A | 7/1997 | Witt et al. | |
| 6,085,263 A * | 7/2000 | Sharma et al. | 710/56 |
| 6,119,223 A | 9/2000 | Witt | |
| 6,122,656 A | 9/2000 | Witt | |
| 7,783,692 B1 * | 8/2010 | Wong et al. | 708/209 |

* cited by examiner

*Primary Examiner*—Brian R Peugh
(74) *Attorney, Agent, or Firm*—Rory D. Rankin; Meyertons, Hood, Kivlin, Kowert & Goetzel, P.C.

(57) ABSTRACT

A processor includes at least one processing core. The processing core includes a memory cache, a store queue, and a post-retirement store queue. The processing core retires a store in the store queue and conveys the store to the memory cache and the post-retirement store queue, in response to retiring the store. In one embodiment, the store queue and/or the post-retirement store queue is a first-in, first-out queue. In a further embodiment, to convey the store to the memory cache, the processing core obtains exclusive access to a portion of the memory cache targeted by the store. The processing core buffers the store in a coalescing buffer and merges with the store, one or more additional stores and/or loads targeted to the portion of the memory cache targeted by the store prior to writing the store to the memory cache.

20 Claims, 5 Drawing Sheets

MECHANISM TO ACCELERATE REMOVAL OF STORE OPERATIONS FROM A QUEUE

BACKGROUND OF THE INVENTION

1. Field of the Invention

This invention relates to computer processors and, more particularly, to queuing and writing store data to cache.

2. Description of the Related Art

Microprocessors have evolved to include a variety of features aimed at improving the speed and efficiency with which instructions are executed. In addition to advances in clock speed and the resulting reduction in instruction execution time, microprocessors may include pipelines, multiple cores, multiple execution units, etc. that permit some degree of parallel instruction execution. Further performance improvements have also been realized through a variety of buffering, queuing, and caching features intended to overcome bottlenecks in the movement of data to and from memory. For example, microprocessors often include multiple memory caches, arranged hierarchically and shared by multiple cores or execution units. Since, cache accesses are faster than memory accesses, various caching techniques are used to increase the likelihood that data is located in a cache when needed by a core or execution unit.

When multiple cores share memory or cache space, it is necessary to coordinate loading and storing of data in caches and in the shared memory so that a globally consistent view of the data at each location is maintained. For instance, it may be necessary for a given core to obtain exclusive access to a shared memory location before storing cached data in it. In the case where each core has its own level-1 cache but uses a shared, level-2 cache, a similar problem may exist. It may be advantageous to temporarily store data in one or more buffers or queues until exclusive access is obtained in order to permit the core to process additional instructions instead of waiting for the store operation to be completed.

One approach used to address the above concerns is for each core to have a store queue. A store queue may buffer memory operations that have been executed, but not yet committed to cache or memory. Memory operations that write data to memory may be referred to more succinctly herein as "stores". A store may target a particular cache line (or portion of a cache line) and include an address identifying the targeted line as well as including data to be stored within the cache line. In order to improve performance, modern microprocessor cores may execute instructions out-of-order or speculatively. These techniques create a need for stores to be held until the order in which they should be presented to memory is determined and exclusive access to the targeted memory location is granted. Once the order of commitment is determined, the store may be retired. A store queue may be used to hold stores until they are retired, after which they may be committed to cache or to memory when exclusive access to the targeted memory location is granted. Moving store operations to the store queue permits a core's instruction execution pipeline to be used to execute other, subsequent instructions. However, even though queuing stores decouples a core from the operations of retiring stores and acquiring exclusive access to memory, a core may still stall if the store queue becomes full. In order to address the above concerns, what is needed is a way to reduce the chances of a store queue becoming full and stalling its associated processor core.

SUMMARY OF THE INVENTION

Various embodiments of a processor and methods are disclosed. The processor includes at least a first processing core. The first processing core includes a memory cache, a store queue, and a post-retirement store queue. The first processing core is configured to retire a first store in the store queue and convey the first store to both the memory cache and the post-retirement store queue, in response to retiring the first store. In a further embodiment, at least one of the store queue and the post-retirement store queue is a first-in-first-out queue.

In a still further embodiment, to convey the first store to the memory cache, the first processing core obtains exclusive access to a portion of the memory cache targeted by the first store. The first processing core buffers the first store in a coalescing buffer and merges with the first store, one or more additional stores and/or loads targeted to the portion of the memory cache targeted by the first store prior to writing the first store to the memory cache.

In another embodiment, the processor further includes a second processing core and a shared memory shared by the first and second processing cores. The memory cache comprises a level-1 cache and the shared memory comprises a level-2 cache. The first processing core conveys the first store from the post-retirement queue to the shared memory. To convey the first store from the post-retirement store queue to the shared memory, the first processing core obtains exclusive access to a portion of the shared memory targeted by the first store.

Figure 1:
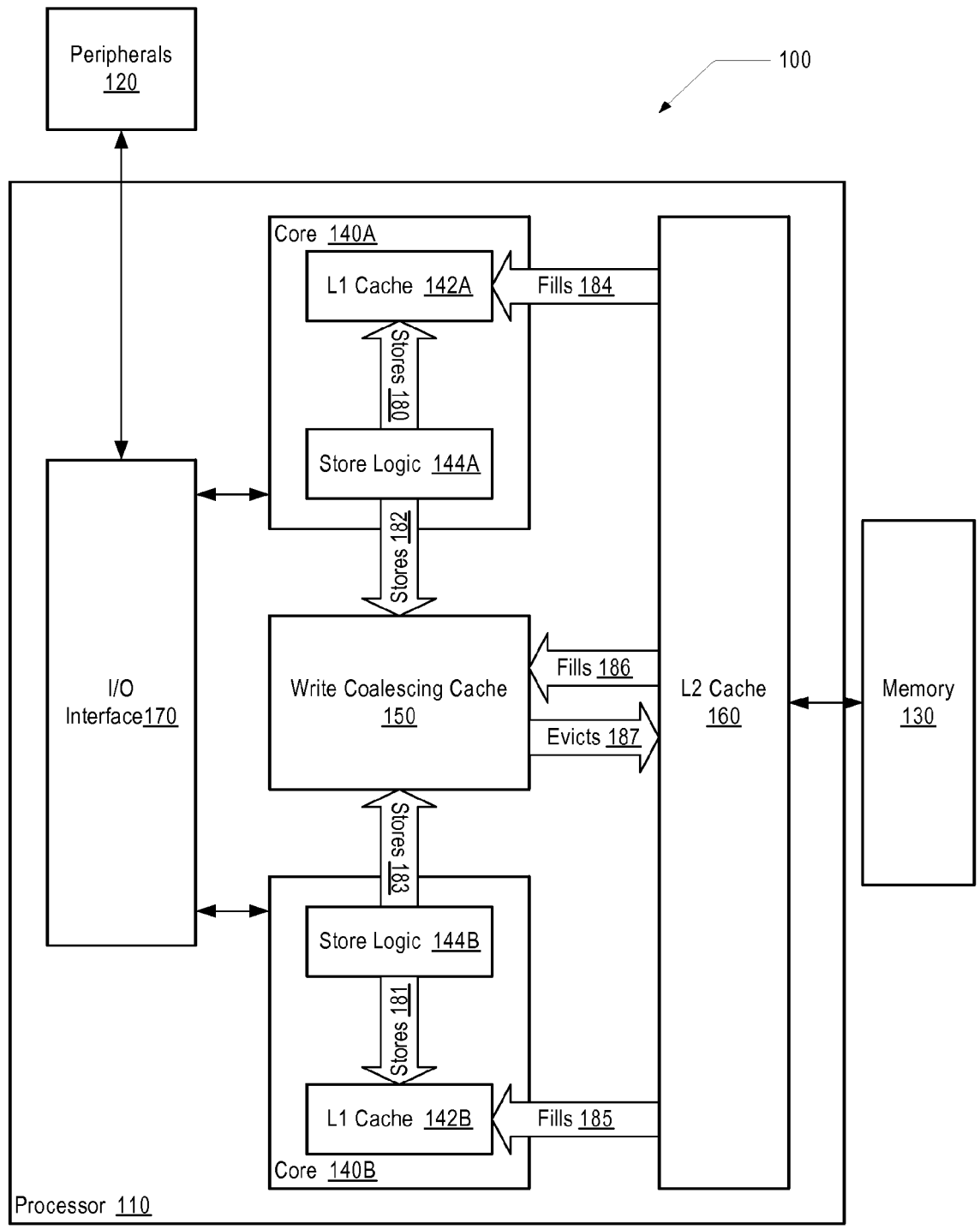
FIG. 1 is a generalized block diagram of one embodiment of a computer system.

While the invention is susceptible to various modifications and alternative forms, specific embodiments are shown by way of example in the drawings and are herein described in detail. It should be understood, however, that drawings and detailed descriptions thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a generalized block diagram of one embodiment of a computer system 100. A variety of other embodiments are also contemplated. In the illustrated embodiment, processor 110 is shown coupled to peripherals 120 and to a memory 130. Peripherals 120 may include any of a variety of devices such as network interfaces, timing circuits, storage media, input/output devices, etc. that may be found in a conventional computer system. Memory 130 may include SDRAM, SRAM, ROM, DRAM and/or other conventional system memory devices. Processor 110 includes cores 140A and 140B, write coalescing cache 150, level-2 cache 160, and I/O interface 170. I/O interface 170 may couple each of cores 140 to peripherals 120. Elements referred to herein by a reference numeral followed by a letter may be collectively referred to by the reference numeral alone. For example, cores 140A and 140B may be referred to as cores 140 and an unspecified one of cores 140 may be referred to as a core 140.

Each of cores 140 includes a level-1 cache 142 and store logic unit 144. Store logic unit 144 (alternately referred to as "store unit") may represent a portion of a load/store unit, a separate logic unit, or a combination thereof. Store logic 144 is coupled to both level-1 cache 142 and level-2 cache 150 to enable core 140 to write to either cache level. More specifically, store logic 144 may convey stores 180 to level-1 cache 142 and stores 182 to write coalescing cache 150. Write coalescing cache 150 may be further coupled to level-2 cache 160 via fills 186 and evicts 187. Write coalescing cache 150 may coalesce stores 182 and 183 with fills 186 to produce a reduced number of evicts 187. Level-2 cache 150 may be further coupled to each level-1 cache 142. More specifically, level-2 cache 160 may convey fills 184 to level-1 cache 142A and fills 185 to level-1 cache 142B. Level-2 cache 160 may also be bi-directionally coupled to memory 130.

During operation, core 140 may execute a stream of instructions including loads and stores. When an instruction is decoded to produce a store, the resulting store may be sent to store logic 144 for further processing. In one embodiment, cores 140 may follow a write-through cache policy, according to which any store that is sent to level-1 cache 142 is also sent to level-2 cache 160 via write coalescing cache 150. Consequently, processing of stores that are received by store logic 144 may be subject to the core gaining exclusive access to the target location in level-2 cache 160 or memory 130. A detailed description of a process by which store logic 144 handles stores is given below.

Although system 100, as shown, include two cores, in alternative embodiments more than two cores may be included and/or each core may represent a cluster of execution units. Additional level-2 caches may also be included in further alternative embodiments in which more than two cores are included. Further, although cache 160 is shown coupled directly to memory 130 and memory 130 is shown as off-processor memory, processor 110 may include a memory controller and/or on-processor memory. Alternatively, an off-processor memory controller may couple level-2 cache 160 to memory 130. A variety of processor core and memory configurations will be apparent to one of ordinary skill in the art.

Figure 2:
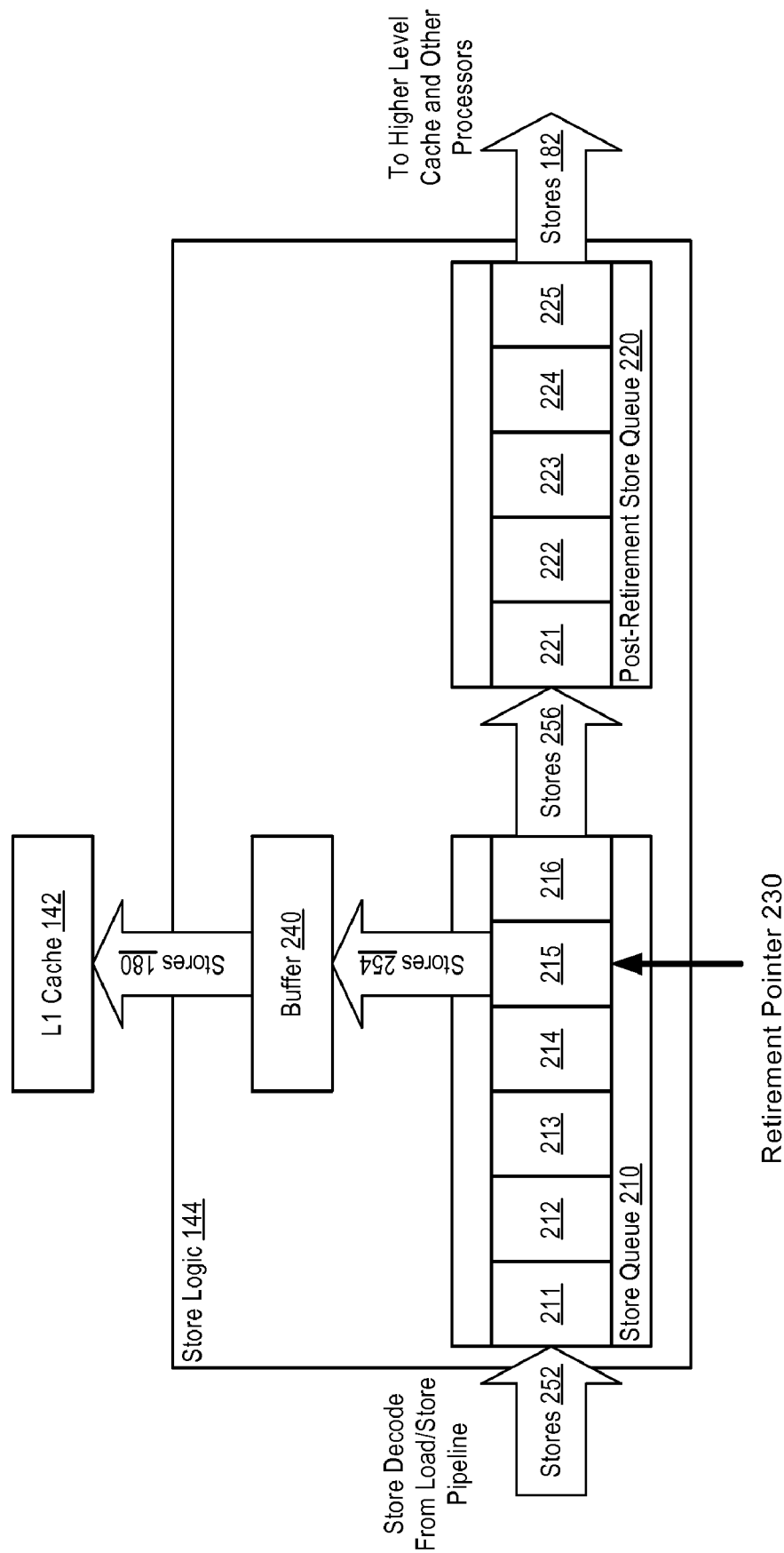
FIG. 2 is a detailed block diagram of one embodiment of store logic.

FIG. 2 is a detailed block diagram of one embodiment of store logic 144. In the illustrated embodiment, store logic 144 includes a store queue 210, a post-retirement store queue 220, and a buffer 240. Store queue 210 may include store locations 211-216. Post-retirement store queue 220 includes store locations 221-225. In one embodiment, store locations 211-216 and 221-225 may be linked to form first-in-first-out storage queues. Store queue 210 may be coupled to post-retirement store queue 220 and to buffer 240, which in turn may be coupled to level-1 cache 142. Although the illustrated store queue 210 includes six locations and the illustrated post-retirement store queue 220 includes five locations, in alternative embodiments the number of locations in store queue 210 or post-retirement store queue 220 may be either more or fewer than illustrated, depending on timing, bandwidth, and latency considerations.

During operation, store queue 210 may receive one or more decoded stores 252 from a load/store pipeline of a core 140. Store queue 210 may maintain received stores in a queue until they are ready to be retired. A retirement pointer 230 may be received from core 140 to indicate the least recent store that is retired. Once a store is retired, it is ready to be sent to cache. Store queue 210 may send each retired store to buffer 240 as well as to post-retirement store queue 220.

Stores that are sent to buffer 240 become part of stores 254 and may be buffered by buffer 240 until access to a target cache line within level-1 cache 142 is granted. Once access is granted, buffer 240 may send a store to level-1 cache 142 as part of stores 180. In one embodiment, buffer 240 may be a fill coalescing buffer. For example, buffer 240 may combine stores to the same target cache line prior to sending them to level-1 cache 142. In a further embodiment, buffer 240 may receive fills from level-2 cache 160 and combine them with stores 254 prior to sending them to level-1 cache 142. In an alternative embodiment, buffer 240 may be external to store logic 144, either built into level-1 cache 142 or placed between store logic 144 and level-1 cache 142. In a further alternative embodiment, store queues 210 and 220 may be combined into a single queue with a tap for removing stores after they have been retired.

Stores that are sent to post-retirement store queue 220 become part of stores 256. Stores 256 may be maintained in a queue comprising locations 221-225 until access to a target cache line within level-2 or higher cache, memory, or other storage structures associated with other processors is granted. Once access is granted, post-retirement store queue 220 may convey a store as part of stores 182.

Figure 3:
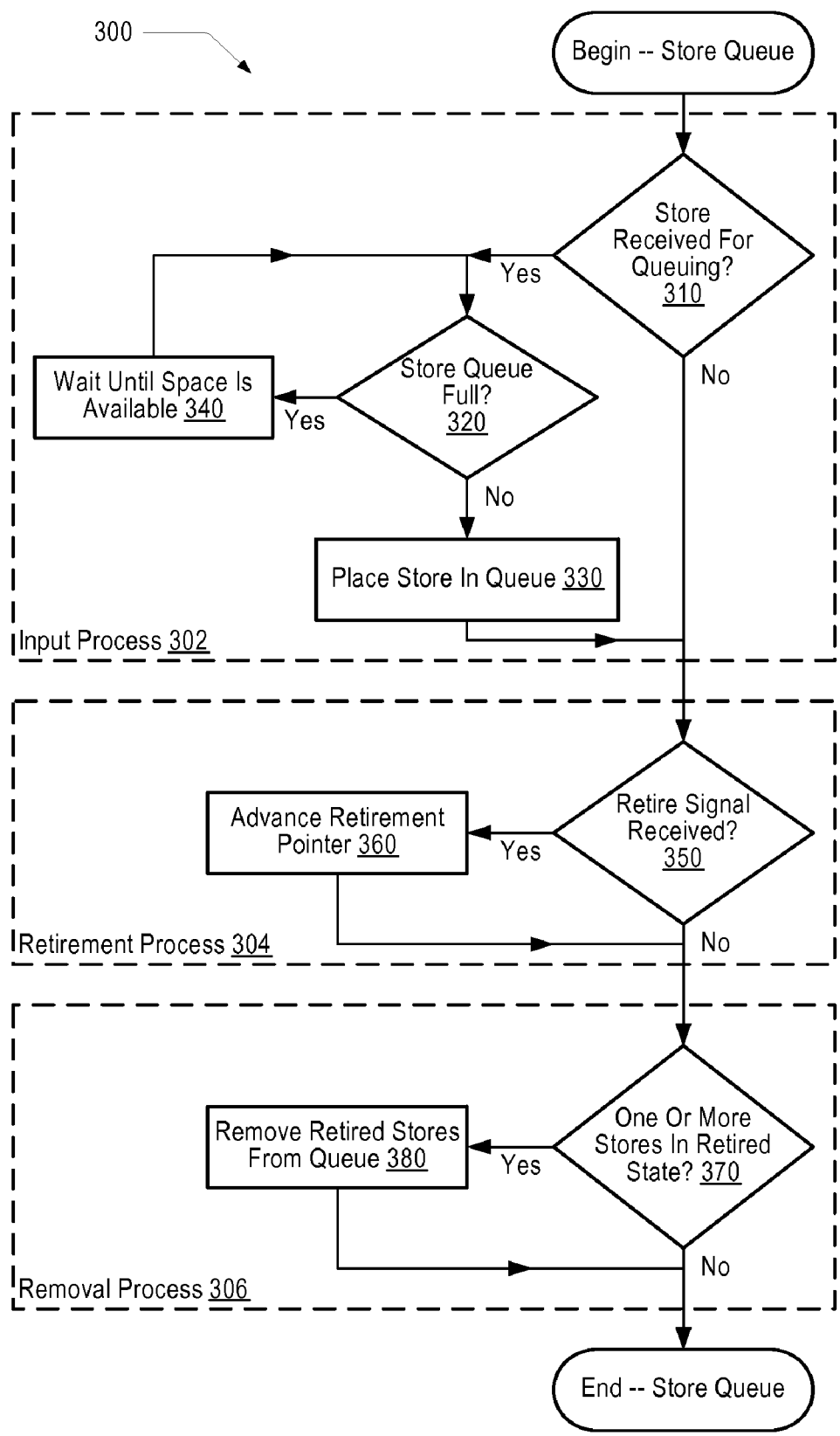
FIG. 3 illustrates one embodiment of a process that may be used to operate a store queue.

FIG. 3 illustrates one embodiment of a process 300 that may be used to operate a store queue. In the illustrated embodiment, process 300 includes an input process 302, a retirement process 304, and a removal process 306. Process 300 may execute processes 302, 304, and 306 sequentially as shown. In alternative embodiments, two or more of processes 302, 304, and 306 may be executed in parallel. Process 300 may execute process 302, 204, and 306 in a continuous loop, although for simplicity, a single pass through processes 302, 304, and 306 will now be described.

Process 300 may execute process 302, which may begin with reception of a store for queuing (decision block 310). If a store is received, and if the store queue is not full (decision block 320), then the received store may be placed in the queue (block 3330). If the queue is full, then process 300 may wait until space is available (block 340). If a store is not received, then process 300 may execute retirement process 304, which may detect a retire signal (decision block 350). If a retire signal is received, then a retirement pointer may be advanced (block 360). If a retire signal is not received, then process 300 may execute removal process 306, which may detect that one or more stores are in the retired state (decision block 370). Once stores are retired, they may be removed from the queue (block 380). If no stores are retired, then process 300 may end.

Figure 4:
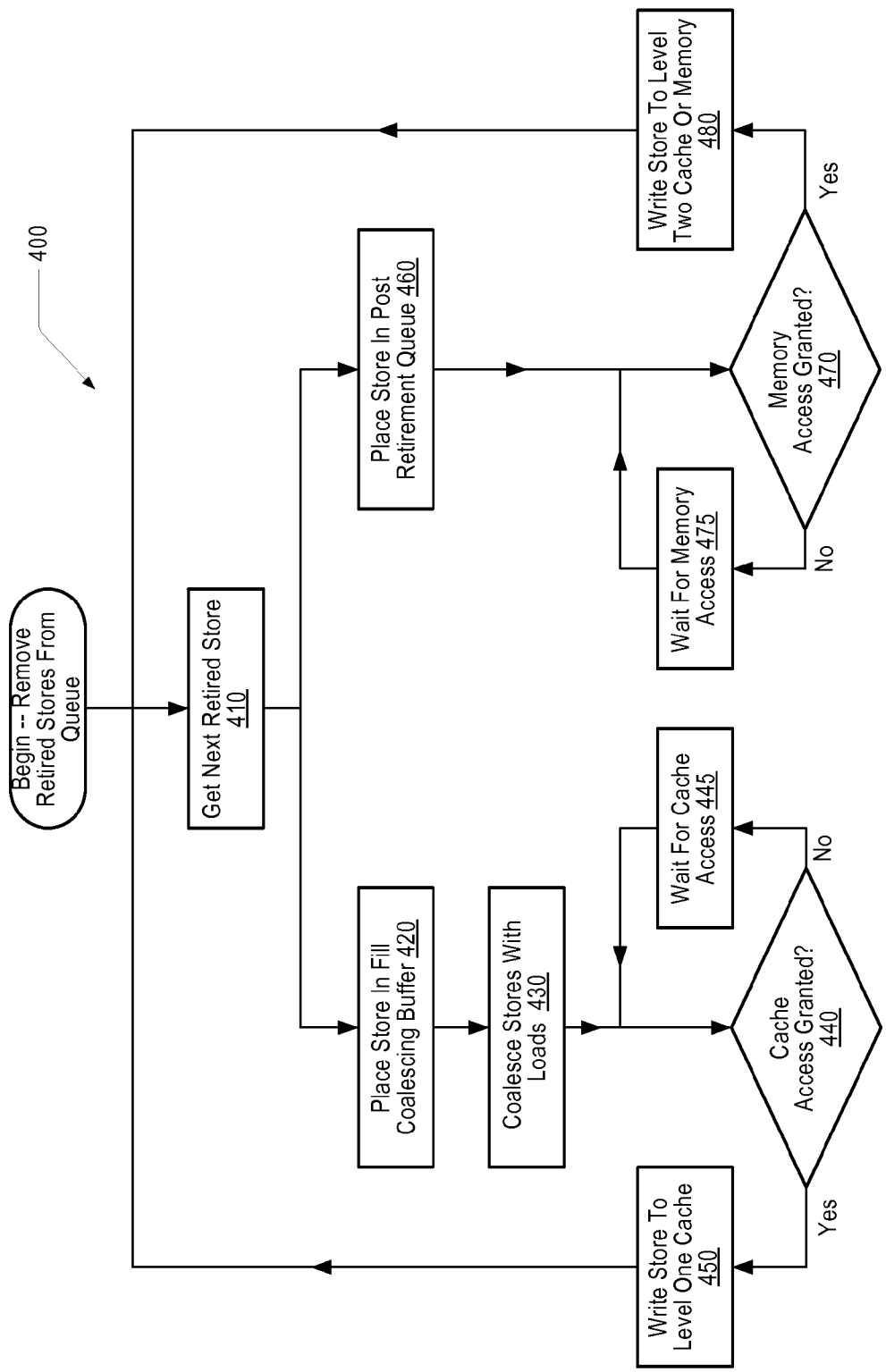
FIG. 4 illustrates one embodiment of a process that may be used to remove a series of stores from a store queue after retirement.

FIG. 4 illustrates one embodiment of a process 400 that may be used to remove a series of stores from a store queue after retirement. Process 400 represents one implementation of block 380 as shown in FIG. 3. Process 400 may begin by getting the next retired store from a store queue (block 410). Each store may then be placed in a fill coalescing buffer (block 420) while a copy of each store may be placed in a post-retirement queue (block 460) in parallel. Stores placed in the fill coalescing buffer may be coalesced (block 430) according to a process that will be described further below. Access to a cache line targeted by each store in the fill coalescing buffer may be requested. Until access is granted, stores remain in the fill coalescing buffer (block 445). If access is granted (decision block 440), a store may be written to the level-1 cache (block 450), and flow may return to block 410 to get the next store. Access to a cache line at level-2 or above, targeted by each store in the post-retirement queue may be requested. Until access is granted, stores remain in the post-retirement queue (block 475). If access is granted (decision block 470, a store may be written to the higher level cache (block 480), and flow may return to block 410 to get the next store.

Figure 5:
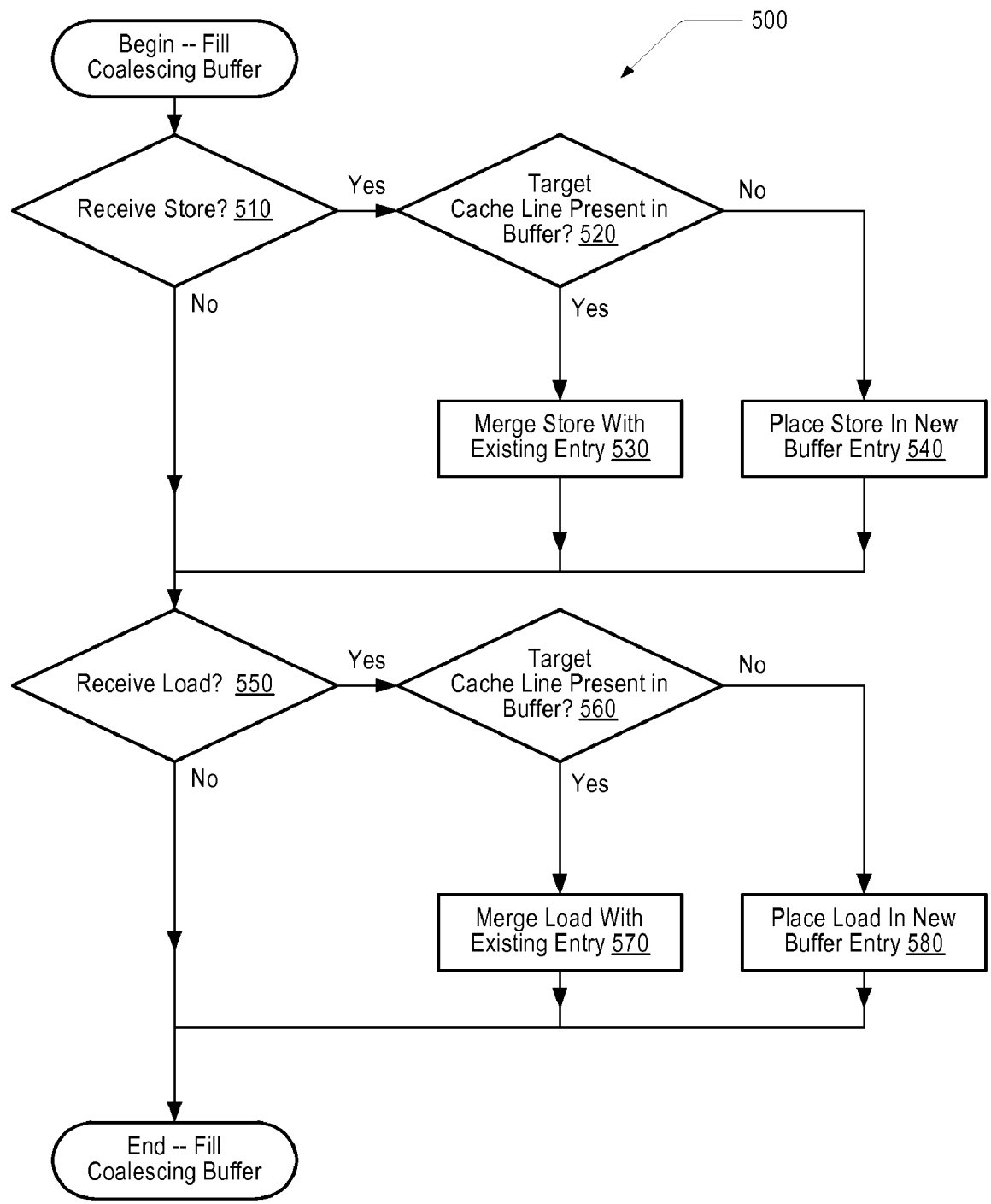
FIG. 5 illustrates one embodiment of a process that may be used to coalesce a series of stores.

FIG. 5 illustrates one embodiment of a process 500 that may be used to coalesce a series of stores. Process 500 represents one implementation of block 430 as shown in FIG. 4. Process 500 may begin reception of a store (decision block 510). If a store is received, and if the store targets a cache line that is present in the buffer (decision block 520), then the received store may be merged with the existing cache line in the buffer (block 530). If the received store targets a cache line for which there is not a line stored in the buffer, then the received store may be placed in the buffer (block 540). Next, if no store is received, or after placing or merging a received store, then process 500 may receive a load (decision block 550). If a load is received, and if the load targets a cache line that is present in the buffer (decision block 560), then the received load may be merged with the existing cache line in the buffer (block 570). If the received load targets a cache line for which there is not a line stored in the buffer, then the received load may be placed in the buffer (block 580). Next, if no load is received, or after placing or merging a received load, then process 500 may end. Although a single pass through process 500 has been described for simplicity, in one embodiment, process 500 may execute in a continuous loop.

It is noted that the above-described embodiments may comprise software. In such an embodiment, the program instructions that implement the methods and/or mechanisms may be conveyed or stored on a computer accessible medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Still other forms of media configured to convey program instructions for access by a computing device include terrestrial and non-terrestrial communication links such as network, wireless, and satellite links on which electrical, electromagnetic, optical, or digital signals may be conveyed. Thus, various embodiments may further include receiving, sending or storing instructions and/or data implemented in accordance with the foregoing description upon a computer accessible medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
at least a first processing core, wherein the first processing core includes a memory cache, a store queue, and a post-retirement store queue;
wherein the first processing core is configured to:
retire a first store in the store queue; and
convey the first store to both the memory cache and the post-retirement store queue, in response to retiring the first store.

2. The processor of claim 1, wherein at least one of the store queue and the post-retirement store queue is a first-in-first-out queue.

3. The processor of claim 1, wherein to convey the first store to the memory cache, the first processing core is further configured to obtain exclusive access to a portion of the memory cache targeted by the first store.

4. The processor of claim 1, wherein to convey the first store to the memory cache, the first processing core is further configured to:
buffer the first store in a coalescing buffer; and
merge with the first store, one or more additional stores and/or loads targeted to the portion of the memory cache targeted by the first store prior to writing the first store to the memory cache.

5. The processor of claim 1, further comprising:
a second processing core; and
a shared memory shared by the first and second processing cores.

6. The processor of claim 5, wherein the memory cache comprises a level-1 cache and the shared memory comprises a level-2 cache.

7. The processor of claim 5, wherein the first processing core is further configured to convey the first store from the post-retirement queue to the shared memory.

8. The processor of claim 7, wherein to convey the first store from the post-retirement store queue to the shared memory, the first processing core is further configured to obtain exclusive access to a portion of the shared memory targeted by the first store.

9. A store unit comprising:
a store queue; and
a post-retirement store queue;
wherein the store unit is configured to:
retire a first store in the store queue; and
convey the first store to both a memory cache and the post-retirement store queue, in response to retiring the first store.

10. The store unit of claim 9, wherein to convey the first store to the memory cache, the store unit is further configured to obtain exclusive access to a portion of the memory cache targeted by the first store.

11. The store unit of claim 9, wherein to convey the first store to the memory cache, the store unit is further configured to:
buffer the first store in a coalescing buffer; and
merge with the first store, one or more additional stores and/or loads targeted to the portion of the memory cache targeted by the first store prior to writing the first store to the memory cache.

12. The store unit of claim 9, wherein the store unit is further configured to convey the first store from the post-retirement queue to a shared memory.

13. The store unit of claim 12, wherein the memory cache comprises a level-1 cache and the shared memory comprises a level-2 cache.

14. The store unit of claim 12, wherein to convey the first store from the post-retirement store queue to the shared memory, the store unit is further configured to obtain exclusive access to a portion of the shared memory targeted by the first store.

15. A method comprising:
retiring a first store in a store queue of a store unit;
conveying the first store to both a memory cache of the store unit and a post-retirement store queue of the store unit, in response to retiring the first store.

16. The method of claim 15, wherein conveying the first store to the memory cache further comprises obtaining exclusive access to a portion of the memory cache targeted by the first store.

17. The method of claim 15, wherein conveying the first store to the memory cache further comprises:

buffering the first store in a coalescing buffer; and merging with the first store, one or more additional stores and/or loads targeted to the portion of the memory cache targeted by the first store prior to writing the first store to the memory cache.

18. The method of claim 15, further comprising conveying the first store from the post-retirement queue to a shared memory.

19. The method of claim 18, wherein the memory cache comprises a level-1 cache and the shared memory comprises a level-2 cache.

20. The method of claim 18, wherein conveying the first store from the post-retirement store queue to the shared memory further comprises obtaining exclusive access to a portion of the shared memory targeted by the first store.

* * * * *